Figure 1:
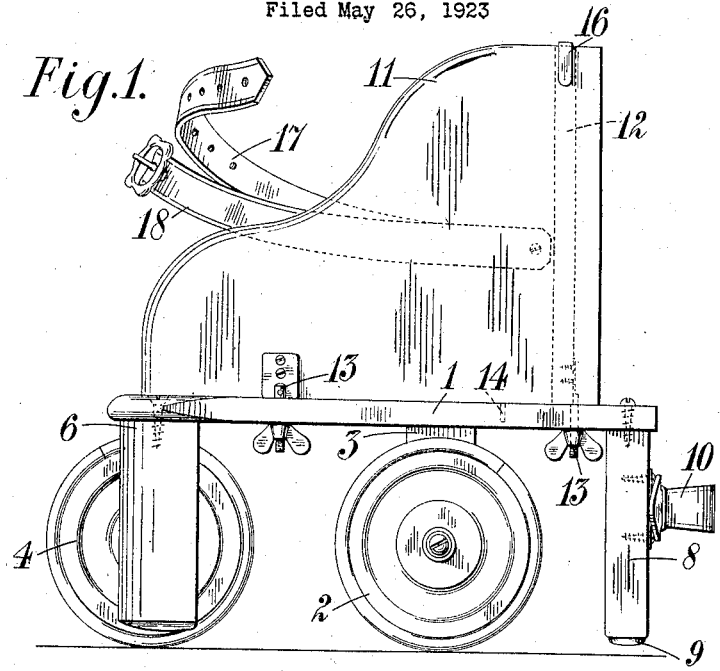

Patented June 2, 1925.

1,540,255

UNITED STATES PATENT OFFICE.

NICOLA CORSI, OF BROOKLYN, NEW YORK.

AUTOMOBILE BRAKE-CONTROLLING APPARATUS.

Application filed May 9, 1923. Serial No. 637,906.

*To all whom it may concern:*

Be it known that I, NICOLA CORSI, a subject of the King of Italy, residing at Brooklyn, in the city of New York, county of Kings, and State of New York, have invented certain new and useful Improvements in Automobile Brake-Controlling Apparatus, of which the following is a full, clear, and exact description, reference being had to the accompanying drawings, forming a part of this specification.

This invention relates to automobile brake controlling apparatus adapted to automatically operate the brake or brakes when the vehicle should strike against an obstacle of some kind; and more particularly relates to means automatically controlling the brake or brakes of an automobile, adapted to be connected to and operated by the resilient portion of a buffer mounted on the automobile in the ordinary manner.

The primary object of this invention is to provide a novel and improved method of increasing the efficiency of automobile buffers or shock absorbers, by causing the same to automatically operate the vehicle brake or brakes when deformed as a consequence of an impact against an obstacle.

A further object of this invention is to provide a novel apparatus of a simple design, adapted to be connected to the resilient portion of an automobile buffer and to the brake or brakes of the vehicle on which the same is mounted, and to operate said brake or brakes upon said buffer striking against an obstacle.

Another object is to provide a novel and improved type of automobile brake controlling apparatus, causing the automatic operation of the brake or brakes of the vehicle upon said vehicle striking against an obstacle of some kind, and allowing the normal operation of the brake or brakes by means of pedal or hand lever, to take place in the ordinary manner.

With these and other objects in view, as will more fully appear as the description proceeds, this invention furthermore consists in certain novel constructions and arrangements of parts as will be fully described and claimed in the appended claims.

The object of automobile buffers or bumpers is well known, the same absorbing the shock due to sudden impacts through the deformation of their resilient portion, and preventing serious damage to the car or to the obstacle encountered; however, while quite effective when the impact is of moderate proportions, these devices are rather ineffective when the momentum of the car is too great, and as a consequence the impact is of a violent nature, since the shock absorbing capacity of these devices is necessarily limited.

By means of this invention, the efficiency of shock absorbers of the buffer or bumper type may be considerably increased, by causing the brake or brakes of the vehicle to instantly co-operate with the same when deformed through the force of a sudden impact; the momentum of the vehicle being thus partly absorbed by the buffer, and partly by the brake surfaces entering into play as soon as the buffer is deformed.

In this manner the time necessary to bring a car to a stop will be considerably decreased, and the ability of a shock absorbing device to protect the same against damage, considerably increased.

By suitably regulating the length and arrangement of the various parts connecting the buffer to the brake or brakes, the braking action may be caused to take place in a gradual manner, timed with the gradual increase in the deformation of the buffer occurring before a shock is entirely absorbed.

Figure 2:
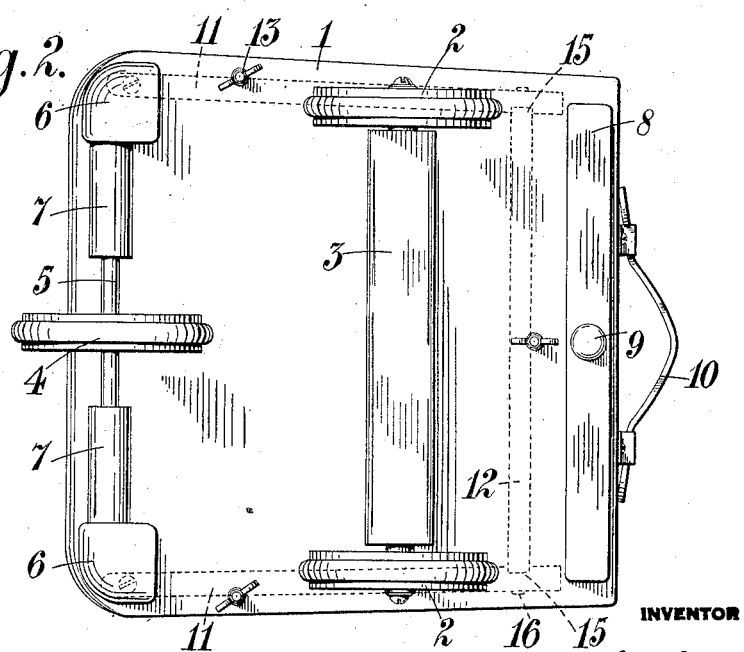

In the drawings I show, for illustrative purposes only, and not in a limiting sense, one of the arrangements whereby my invention may be carried into practice; and in the same:

Fig. 1 is a fragmentary side view in elevation of the front part of a motor car frame, embodying my invention; and, Fig. 2 is a fragmentary plan view of the same.

While in said drawings I illustrate my invention as applied in connection with bumpers of buffers of the ordinary type, on account of this being an arrangement capable of immediate application, my invention does not exclude the possibility of employing any suitable type of shock absorbber, a transversely mounted brake controlling rocking shaft, a lever attached at each end of said shaft, a bracket attached at each side of said frame at an intermediate point between said bumper and said shaft, said brackets being capable of front to rear adjustment on said frame, a cross lever pivoted at an intermediate point on each bracket, a link connecting one of the arms of each cross lever to said front member, and a flexible member connecting the other arm of each cross lever to the rocking shaft lever at the rear thereof.

NICOLA CORSI.

June 2, 1925.

W. P. CRESSWELL

BABY CARRIAGE

Filed May 26, 1923

1,540,256

INVENTOR

Walter Percy Cresswell

By Byrnes, Stebbins & Parmelee

His Attys